W. PATERSON.
PITMAN.
APPLICATION FILED DEC. 11, 1908.

947,740.

Patented Jan. 25, 1910.

WITNESSES:

INVENTOR.
William Paterson

UNITED STATES PATENT OFFICE.

WILLIAM PATERSON, OF TORONTO, ONTARIO, CANADA.

PITMAN.

947,740. Specification of Letters Patent. Patented Jan. 25, 1910.

Application filed December 11, 1908. Serial No. 467,037.

*To all whom it may concern:*

Be it known that I, WILLIAM PATERSON, of the city of Toronto, in the county of York, in the Province of Ontario, Canada, pattern-maker, having invented certain new and useful Improvements in Pitmen, do hereby declare that the following is a full, clear, and exact description of the same.

My invention relates to improvements in pitmen, and the object of my invention is to provide simple and effective means of locking and releasing the ball retaining socket. I attain this object by the mechanism illustrated in the accompanying drawings, in which:—

Figure 1:
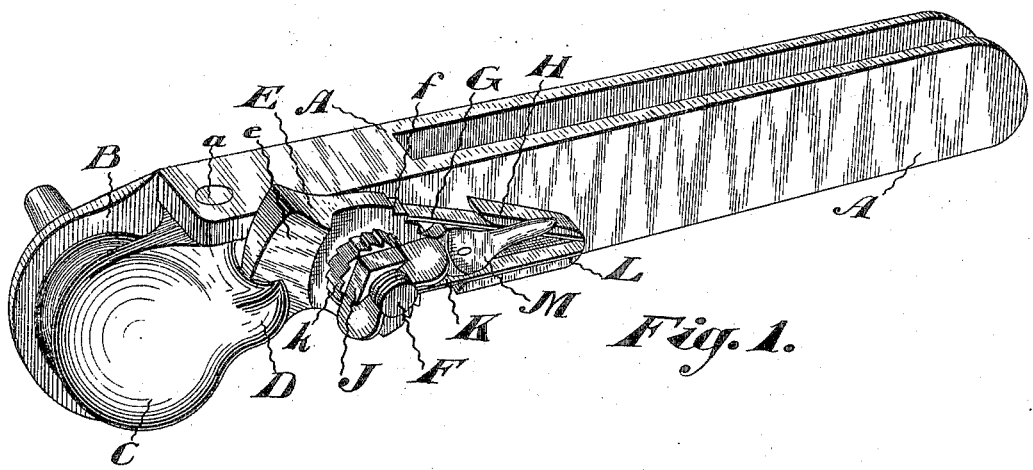
Figure 2:
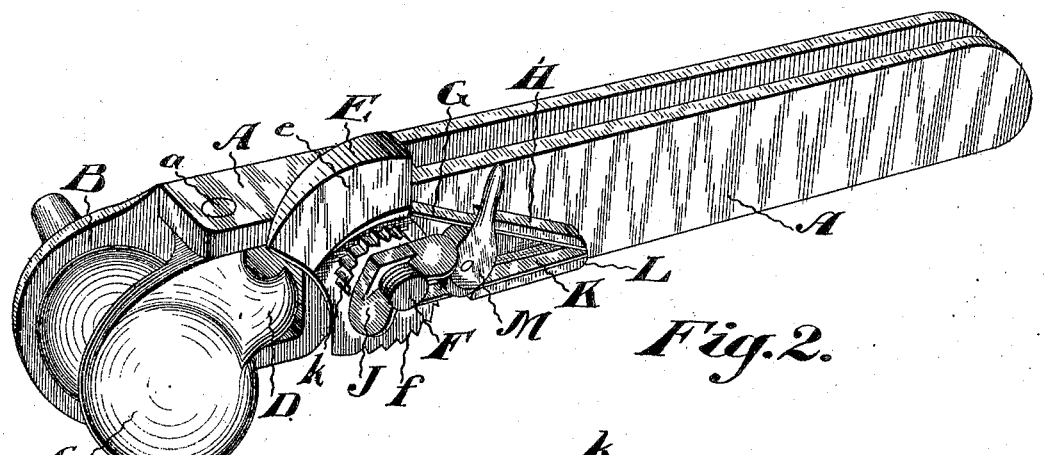
Figure 3:
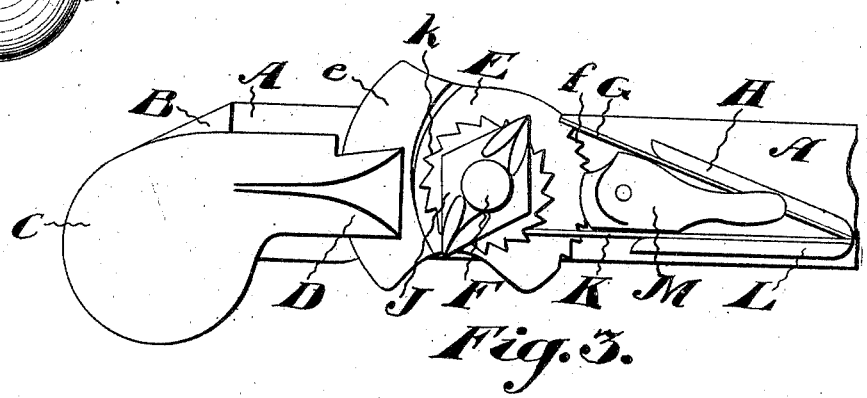

Figure 1, is a perspective view of pitman, showing ball retaining socket locked. Fig. 2 is a perspective view of pitman showing ball retaining socket released. Fig. 3 is a side elevation of a section of pitman showing locking mechanism.

In the drawings like letters of reference indicate corresponding parts in each figure.

"A," is the main arm of the pitman.

"B," is the ball socket section forming part of the main arm "A."

"C," is a ball socket section pivoted to the main arm "A" at "a," and designed to swing back to release the ball.

"D" is a lug extending out from the ball socket section "C" designed to bear against the wedge shaped surface "e" of the pivoted cam "E." The cam "E" which is pivoted to the main arm "A" by means of a bolt "F," is made with small ratchet teeth, "f." A flat spring steel dog, "G," secured to an extending lug "H" on the main frame "A" engages the ratchet teeth "f," and locks the cam "E" in position. A ratchet thumb nut "J" on the bolt "F", securely locks the cam "E" in any desired position, to the main frame "A". A flat spring steel dog "K" secured to an extending lug "L" on the main frame "A", engages the teeth "k" of the ratchet thumb nut "J", securely locking same. An eccentric lever "M" pivoted to the main arm "A", is designed to release the flat spring steel dogs "G" and "K".

To release the ball from the pitman, the eccentric lever "M" is raised. This releases the spring steel dogs, "G" and "K," from the ratchet teeth "f" and "k," permitting the ratchet thumb nut "J" to be unscrewed. This will allow the pivoted cam "E" to swing back, releasing the wedge shaped surface "e" from the extending lug "D." The pivoted ball socket section "C" swings back, releasing the ball.

What I claim as my invention is:—

1. In a pitman connection, the combination of a frame, a movable socket section pivotally secured to the frame, a pivoted cam mounted to turn on the frame for engagement with the movable socket section, a clamping means for holding the cam in place, members for retaining the cam and said clamping means in working relation with the movable socket section, and manually operated means for raising or lowering the members into or out of engagement with the pivoted cam and the said clamping means.

2. In a pitman connection, the combination of a frame, a pivoted ball socket section, a cam wedge having ratchet teeth thereon, a thumb nut provided with ratchet teeth, pawl members arranged to engage the teeth on the cam wedge and thumb nut, and manually operated means for raising or lowering the pawl members into or out of engagement with the ratchet teeth on the said cam wedge and thumb nut.

3. In a pitman connection, the combination of a frame, a movable socket section mounted to turn thereon, a pivoted ratchet cam mounted to turn on the frame for engagement with the movable socket section, a clamping means for holding the cam in place, means for retaining the ratchet cam and clamping means in working relation with the movable socket section, and a manually controlled cam lever coöperating with the members for raising and lowering them into or out of engagement with the pivoted ratchet cam and the said clamping means.

WILLIAM PATERSON.

Witnesses:
E. MERNER,
D. S. TOVELL.